United States Patent [19]

Högberg et al.

[11] Patent Number: 4,780,620
[45] Date of Patent: Oct. 25, 1988

[54] TIME MULTIPLEX SYSTEM FOR TRANSMITTING INFORMATION BETWEEN VEHICLE COMPONENTS

[75] Inventors: Bo Arne G. Högberg, Årjäng; Inge W. Åhs, Koppom, both of Sweden

[73] Assignee: Telefonaktiebolaget L M Ericsson, Stockholm, Sweden

[21] Appl. No.: 65,368

[22] Filed: Jun. 23, 1987

[30] Foreign Application Priority Data

May 7, 1987 [SE] Sweden .................. 8701889

[51] Int. Cl.$^4$ .......... H04J 3/06; G08C 15/06
[52] U.S. Cl. ................. 307/10 R; 340/52 F; 340/825.2; 370/85
[58] Field of Search .......... 307/9, 10 R, 10 LS, 307/38; 340/52 F, 825.21, 825.2, 870.15; 364/424; 370/85

[56] References Cited

U.S. PATENT DOCUMENTS

| | | | |
|---|---|---|---|
| 3,648,057 | 3/1972 | Sognefest et al. | 307/10 R |
| 3,651,454 | 3/1972 | Venema et al. | 307/10 R X |
| 3,864,578 | 2/1975 | Lackey | 307/10 R |
| 3,891,965 | 6/1975 | Schroeder | 340/52 F |
| 4,015,136 | 3/1977 | Holt | 307/10 LS X |
| 4,122,357 | 10/1978 | Sumida | 307/10 LS X |
| 4,370,561 | 1/1983 | Briggs | 370/85 X |
| 4,578,591 | 3/1986 | Floyd et al. | 307/10 R |
| 4,584,487 | 4/1986 | Hesse et al. | 307/10 R |
| 4,593,282 | 6/1986 | Acampora et al. | 370/85 X |
| 4,594,571 | 6/1986 | Neuhaus et al. | 340/52 F |
| 4,652,853 | 3/1987 | Tagami et al. | 307/10 R X |

*Primary Examiner*—Bentsu Ro
*Attorney, Agent, or Firm*—Burns, Doane, Swecker & Mathis

[57] ABSTRACT

The invention relates to a system for time multiplex transmission of analogue and digital information between components in a vehicle. The system includes a synchronizing unit (1) and a plurality of transmission units (2A, 2B, ..., 2H) connected to a bus (B) with at least three bus conductors (BC1, BC2, BC3, BC4) for power supply and transmission of signals between the units. The synchronizing unit and transmission units may assume either an active state or a standby state. In its active state the synchronizing unit sends timing signals on a second of the bus conductors (BC2) for synchronizing the transmission units, and for definition of a plurality of time slots on a first of the bus conductors (BC1). In its active state, each of the transmission units can send and/or receive information selectively in at least one time slot on the first bus conductor (BC1). The synchronizing unit does not send any time controlling signals in its standby state. In its standby state a transmission unit lacks the ability of selectively receiving information from the first bus conductor or selectively sending information in a given time slot on the first bus conductor. Different criteria for changing between active state and a standby state apply to different transmission units.

18 Claims, 4 Drawing Sheets

TIME MULTIPLEX SYSTEM FOR TRANSMITTING INFORMATION BETWEEN VEHICLE COMPONENTS

TECHNICAL FIELD

The present invention relates to a system for time multiplex trasmission of information between components in a vehicle. The system is intended for enabling the transmission of analogue and digital information from automatic transducers and manually operated means in a vehicle to analogue and digital display means and servo motors, engines, etc. in the vehicle. In a vehicle, the system is intended entirely or partially to enable the replacement of conventional electrical systems for current supply and control of audiovisual display and warning means, as well as the control of servo motors and other actuating means.

BACKGROUND ART

Most automobiles are still manufactured with an electrical system of conventional type, where separate electrical conductors are taken from lamps and other audiovisual means as well as servo motors and solenoids and the like, to the automatic and manual indicators and control means that are to control the lamps, servo motors, etc. However, there are described in patent publications several time multiplex systems intended for entirely or partially replacing conventional electrical systems for current supply and control of different components included in the equipment of the vehicle. Examples of publications where such systems are described include U.S. Pat. Nos. 3,651,454; 3,891,965; 4,015,136; 4,015,136; 4,370,561; 4,578,591; 4,584,487 and No. 4,594,571.

The configuration of conventional electrical systems for vehicles make them suitable for transmission of analogue information, e.g. coolant temperature and fuel quantity as well as digital information such as ON/OFF. Although it has been proposed to use time multiplex systems for trasmission of both analogue and digital information, as in U.S. Pat. Nos. 3,651,454, 3,891,965 and No. 4,015,136, for example, many time multiplex systems for vehicles are not particularly suitable for transmitting both analogue and digital information.

Conventional electrical systems for automobiles are often formed such that certain components, e.g. parking lights, can be used irrespective of whether the vehicle is being driven or whether it is parked and locked. Conventional electical systems are also usually formed so that certain components, e.g. a car radio, can be used only if the ignition is unlocked. On the other hand, it is not necessary for the ignition to be switched on. Finally, conventional electrical systems are often formed such that some components with high power consumption e.g. headlight low beams can only be switched on when the ignition is switched on, or when the generator is charging. The purpose of this is to prevent the battery from becoming discharged too quickly, e.g. by the low beams being left switched on when the vehicle is not in use. At the same time the components usually need to be used in a given situation are useable in that situation and the built-in safety against too-rapid discharge of the battery is usually not experienced as irritating or disturbing by the person using the vehicle.

Conventional electrical systems can be easily formed so that in principle they do not consume any power when the vehicle is not used, but in spite of this they have a facility of controlling certain components even before the vehicle ignition is switched on. A conventional electrical system with separate conductors can be formed, for example so that when the vehicle is locked and parked its central door lock can be operated by the door key, in spite of the electrical system not consuming any notable power before the central lock is operated by the door key.

Most of the proposed time multiplex systems for auotmobiles do not have the above-mentioned properties. Power supply to the multiplex system is either ON, the multiplex system then having the maximum capacity for transmitting information, or the power supply to the multiplex system if OFF, the system then completely lacking capacity of transmitting information. When the power suppy to the multiplex system is ON, which can be arranged via the ignition lock or a separate means, the multiplex system has a power consumption which is not completely negligible.

A system is described in the U.S. Pat. No. 3,864,578 for transmitting information in time multiplex in vehicles, this system being formed to enable the assumption of an active mode with comparatively high power consumption, or a standby mode with comparatively low power consumption. When this system is in active mode it has maximum capacity for transmitting information in the vehicle. From its active state the system enters into its standby mode of operation when neither the vehicle ignition is ON nor any of a number of "critical" operating means are actuated. In addition, when the system is in its standby mode, it only has the ability of transmitting information enabling the system to enter into its active mode, which occurs when the vehicle ignition is switched on or when any of a number of "critical" operating means is actuated.

The system according to U.S. Pat. No. 3,864,578 includes encoding and decoding means connected to three lines. One of the lines is utilized for power supply to the means and is connected to a battery. Both the other lines are then utilized for transmission of timing signals and information. When the system is in its active mode all the encoding and decoding means are in an active mode as well. In its active mode, a timing encoding means sends a clock signal on one of the lines and a synchronizing signal on the other line. The clock signal has the form of a square wave superposed on a DC voltage. The synchronizing signal has the form of individual pulses superposed on a DC voltage. The clock signal and synchronizing signal together define a plurality of time slots for time multiplex transmission of information. The clock signal and synchronizing signal are received by all the other encoding and decoding means, which are sensitive to the clock signal and are kept in an active mode by it. In an active mode, the encoding and decoding means can send and receive information in the time slots. The transmission of information in the time slots takes place on the same line as the synchronizing signal and in the form of a binary pulse per time slot. The binary pulses are thus trasmitted superposed on a DC voltage. When this system is in its standby mode, both the time controlling encoding means and the remaining encoding and decoding means are in their standby modes. The time controlling encoding means sends neither the clock signal nor the synchronizing signal. On the other hand, battery voltage is available at all encoding and decoding means. When a "critical" operating means connected to one of the remaining encoding and decoding means is actuated, this means provides in its standby mode a DC voltage on the line used for the synchronizing signal. The timing encoding means in its standby mode is sensitive to the potential on this line and is caused by the voltage to assume its active mode and begins to send the clock signal and synchronizing signal. The remaining encoding and decoding means are sensitive to the clock signal in their standby modes and are all caused by it to enter into their active states. Information corresponding to the actuation of the "critical" operating means can thus be transmitted by the system.

Conventional electrical systems for automobiles, apart from battery and generator, have in general no particular vehicle component with a function vital to the whole electrical system. Conventional electrical systems with separate electrical conductors and fuses for a plurality of vehicle components are usually formed such that the main part of the electrical system can function although a part of it has collapsed. Proposed systems for time multiplex transmission for information between vehicle components do not usually have this property. They usually have a central timing or synchronizing means, the function of which is completely decisive for the function of the entire system. If the timing or synchronizing means ceases to send signals, the whole system ceases to function.

DISCLOSURE OF INVENTION

Systems for time multiplex transmission of information between vehicle components can have certain advantages compared with conventional electrical systems in vehicles. Such advantages have been described in publications on the subject and are therefore not repeated here. For a time multiplex system to have more extensive use, it is desirable, however, that it does not lack some valuable properties which conventional electrical systems have. Certain proposed time multiplex systems are not particularly well suited to both analogue and digital transmission of information. Many proposed such systems lack a standby state in which they require substantially less power than in their active state. Most proposed time multiplex systems are not formed so that parts of the system can assume an active state and transmit information to/from certain components simultaneously as other parts of the system can assume a standby state and not transmit information to/from other components. It is therefore a problem with many known time multiplex systems for vehicle components that they do not simultaneously have all the valuable properties to be found in conventional electrical systems. One object of the present invention is to solve this problem.

An other object of the present invention is to create a system for time multiplex transmission of information between vehicle components, which is suitable for analogue and digital transmission of information, and can assume, apart from an active state with full information transmission capacity, one or more standby states with limited ability to transmit information and lower power consumption than in the active state, and is well suited to limit the use of certain components in a similar way as in conventional electrical systems for motor vehicles.

Yet an another object of the present invention is to create a system for time multiplex transmission of information between vehicle components, which includes a synchronizing unit and a plurality of transmission units connected to a bus with at least three bus conductors for power supply and transmission of information between the units, this system being readily adaptable to different vehicles and different variants of a vehicle model, since it does not require any predetermined placement of the synchronizing unit or the transmission units or any certain number of transmission units.

A still further object of the present invention is to create a system for time multiplex transmission of information between vehicle components which does not completely cease to function if a timing or synchronizing unit ceases to send timing signals.

A still further object of the present invention is to create a system for time multiplex transmission of information between vehicle components, which has information transmission channels arranged in pairs, of which one channel in each pair may be used for control signals and the other channel in the pair can be used for acknowledgement or error-indicating signals.

A still further object of the present invention is to provide a system for time multiplex transmission of information between vehicle components, which is simple and cheap to manufacture and install in vehicles.

What is distinguishing for a system in accordance with the invention, and preferred embodiments of such a system, will be seen from the independent claims and the dependent claims. Somewhat simplified, the independent claims could be said to signify the following.

A system for time multiplex transmission of information between vehicle components includes, in accordance with the invention a synchronizing unit and a plurality of transmission units connected to a bus with at least three bus conductors for power supply and transmission of signals between the units. The synchronizing unit and transmission units may assume either an active state or a standby state. In its active state, the synchronizing unit sends timing signals on one of the bus conductors for synchronizing the transmission units and for the definition of a plurality of time slots. Each transmission unit is arranged in its active state to transmit and/or receive information in at least one time slot on an other bus conductor than the one which the time controlling signals are sent. In its standby state, the synchronizing unit does not send time controlling signals at all, or only to a limited extent. In its standby state a transmission unit either completely lacks the ability of selectively receiving information from the bus conductor in a given time slot, or selectively sending on the bus conductor in a given time slot, or the ability of the transmission unit to receive and information is heavily limited compared with what is the case in the active state. A first group transmission units is adapted to go from a standby state to an active state on the presence of timing signals on the bus conductor utilized for transmission of timing signals. A second group of transmission units is adapted to go from a standby state to active state on the presence of information signals in a predetermined time slot on the bus conductor utilized for transmitting information.

Forming a system for time multiplex information transmission between vehicle components in accordance with the invention results in several advantages. Since the system has both a standby state and an active state, the power consumption of the system when the vehicle is not used can be reduced, while at the same time retaining the ability of the system to carry out certain functions, e.g. opening the central lock. Since not all transmission units need to go into the active state at the same time, the use of certain vehicle components can be limited in a similar way as with conventional electrical systems. By the greater freedom with regard to the number of transmission units and their location in the vehicle, the system is readily adaptable to different vehicle models and simple extension in connection with extra equipment on the vehicle. By different bus conductors being utilized for the timing signals and for transmission of information, the number of time slots can be made comparatively large and the signal/noise ratio in analogue transmission can be made comparatively high in relation to used frequencies and voltage variation on the bus conductors. Further advantages of a system in accordance with the invention and in particular in preferred embodiments in accordance with the dependent claims will be understood by one skilled in the art on studying the description of preferred embodiments.

BEST MODES FOR CARRYING OUT THE INVENTION

Figure 1:
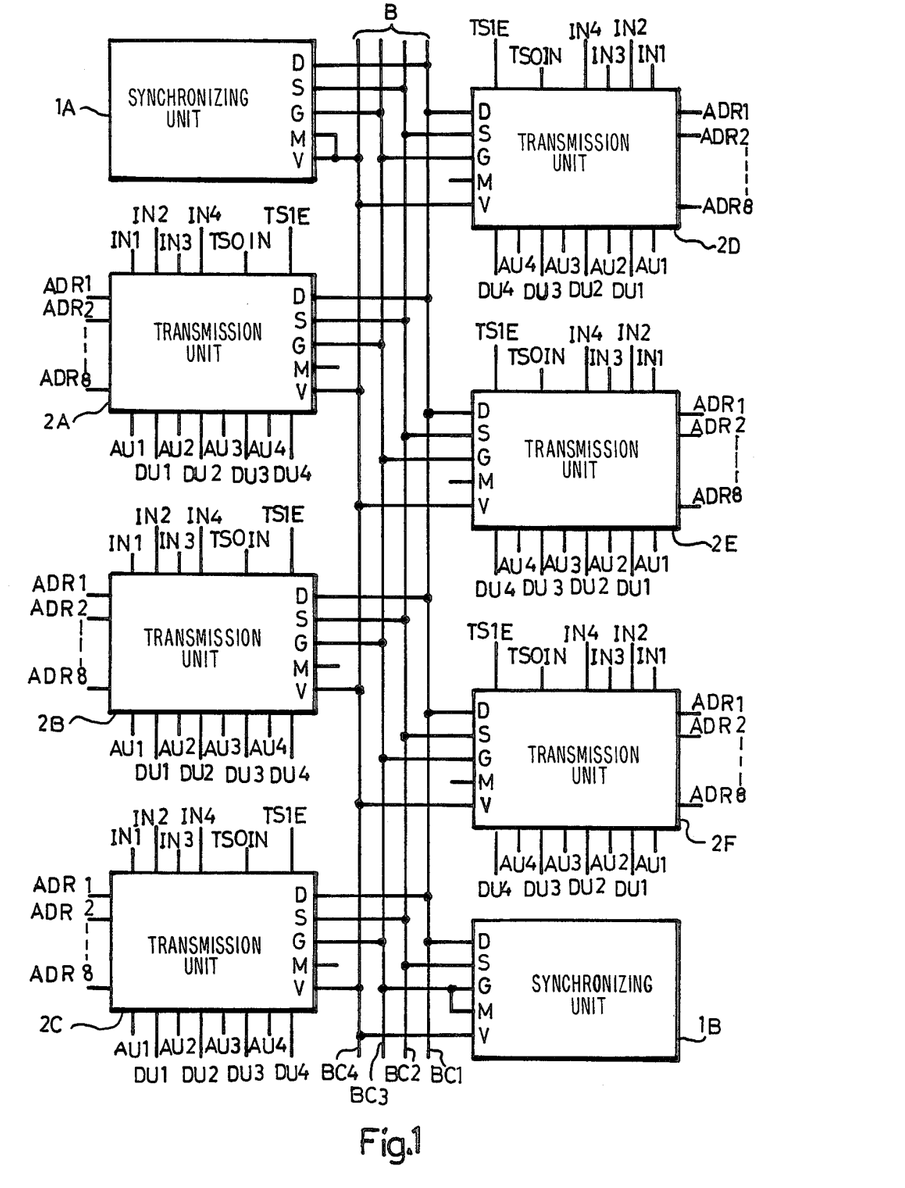
FIG. 1 illustrates, somewhat simplified, parts of a first embodiment of a system in accordance with the invention for time mutliplex transmission of information between vehicle components not illustrated in the figure.

Parts of a system for time multiplex transmission of the information between vehicle components are illustrated somewhat simplified in FIG. 1. For reasons of space, the vehicle components themselves are not illustrated in this figure.

The system in FIG. 1 includes two synchronizing units 1A and 1B, a plurality of transmission units 2A, 2B, 2C, 2D, 2E and 2F, and a bus B. The bus has four bus conductors BC1, BC2, BC3 and BC4. The first bus conductor BC1 is solely intended for information signals. Each synchronizing unit and each transmission has a combined input and output D connected to this bus conductor BC1.

The second bus conductor BC2 is solely intended for time controlling signals. Each synchronizing unit has an output S and each transmission unit has an input S connected to the second bus conductor BC2.

The third bus conductor BC3 is intended for use as a signal ground. Each synchronizing unit and each transmission unit has a connection G connected to this bus conductor BC3.

The fourth bus conductor BC4 is primarily intended for power supply. This conductor is connected in a suitable manner to the vehicle battery and possibly via suitable means to the vehicle generator. Each synchronizing unit and each transmission unit has a feed voltage input V connected to this bus conductor BC4. It is assumed that the vehicle chassis is conductive and is utilized as ground for power supply to the units. Each unit is therefore electrically connected to the vehicle chassis.

Each transmission unit is provided with the following: (1) four information inputs IN1, IN2, IN3, IN4 for analogue or digital information which is to be sent and transmitted in time multiplex on the bus; (2) four analogue information outputs AU1, AU2, AU3 and AU4 and four digital information outputs DU1, DU2, DU3 and DU4 for information transmitted and received in time multiplex on the bus; (3) eight address inputs ADR1, ADR2, ..., ADR8 for binary address information giving four successive time slots in which the respective unit can send and receive information on the bus; and finally an activation input TSOIN, a state input TS1E and an ordinal sequence input M, the purpose of which will be apparent from the description of the function of the transmission unit.

With suitable voltage feed from the fourth bus conductor BC4, a synchronizing unit 1 may assume either an active mode or a standby mode of operation. In its active mode such a unit sends timing signals according to the upper graph in FIG. 2 on the second bus conductor BC2 with the third bus conductor BC3 as signal ground. The timing signals have the task of synchronizing the transmission units with each other and the synchronizing units, as well as to define a plurality of time slots TS0, TS1, ..., TS254 and TS255. As will be seen from FIG. 2, each timing signal has substantially the shape of a square wave with a period per time slot. Each timing signal thus has a pulse for each of the 256 time slots. The amplitude of each pulse is about 12 volts according to FIG. 2. In practice, the amplitude is somewhat less than the difference between the potential on the bus conductor BC4 and the potential on the bus conductor BC3. As will be seen from FIG. 2, the pulse width is approximately as great as the mutual spacing of the pulses, and each pulse occurs during the first half of a time slot. The synchronizing unit does not send several timing signals immediately one after the other but with a given mutual time spacing. The time spacing between the last pulse in a timing signal, i.e. during time slot TS255, and the first pulse in the subsequent timing signal, i.e. during time slot TS0, is several times as large as the time spacing between two successive pulses in a single timing signal, which will be understood from FIG. 2.

In its active mode a synchronizing unit senses the presence of information signals from some transmission unit in time slot TS0 and time slot TS1 on the first bus conductor BC1, the third bus conductor functioning as signal ground. The synchronizing unit remains in its active mode as long as there is some information signal from some transmission unit in time slot TS0 to time slot TS1 on the first bus conductor. If there is no information signal from any transmission unit either in time slot TS0 or TS1 on the first bus conductor, the synchronizing unit assumes its standby mode after a given time lag.

In its standby mode, a synchronizing unit does not send any time controlling signals on the second bus conductor. Each synchronizing unit in this mode is sensitive to information signals on the first bus conductor and for timing signals from some other possible synchronizing unit in the system. If the time controlling signals are not present on the second bus conductor, but information signals are present on the first bus conductor, a synchronizing unit goes from its standby mode to its active mode after a time depending on the potential of the ordinal sequence input. If the potential on a synchronizing unit ordinal sequence input M is high, the synchronizing unit goes to its active state after a comparatively short time. If the potential on the ordinal sequence unit M is low, the unit first goes to its active state after a comparatively long time.

Of the two synchronizing units in the system in FIG. 1, one of them namely 1A has its ordinal sequence input M connected to the bus conductor BC4 and the other, 1B, has its ordinal sequence input M connected to the bus conductor BC3. The synchronizing unit 1B will therefore enter its active mode only if, due to a fault, the synchronizing unit 1A does not enter sufficiently quickly into its active mode on the presence of information on the bus lines BC1.

Since a synchronizing unit can not go from its standby mode to its active mode if timing signals are present on the bus conductor BC2, there is at most one synchronizing unit at a time in its active mode. The power consumption of each synchronizing unit is much lower in the standby mode than in the active mode, inter alia, since there are no timing signals set in the standby mode. Having two synchronizing units in the system thus only leads to a minor increase in power consumption.

For suitable voltage feed from the fourth bus conductor BC4, each transmission unit can assume either an active mode or a standby mode of operation. In its active mode a transmission unit receives the timing signal sent by a synchronizing unit. With the aid of the received signals, a transmission unit detects in its active mode the time slots TS0 and TS1, as well as four successive time slots determined by address information supplied to the respective transmission unit via its address inputs ADR1, . . . , ADR8. All active transmission units thus detect on the time slots TS0 and TS1, irrespectively of received address information. On the other hand, the four remaining time slots detected by the active transmission units can entirely or partially differ from unit to unit depending on the address information supplied to the respective unit. In its active mode a transmission unit can send information signals on the first bus conductor BC1 in time slots determined by the address information, the third bus conductor BC3 functioning as signal ground. Possible information signals which are sent depend on possible information supplied to the information inputs IN1, IN2, IN3 and IN4 of the information unit. Information which is supplied to different information inputs is sent in different time slots on the first bus conductor. For example, if the information input IN1 is kept at a first potential within given limits, the transmission unit will try to achieve a voltage on the first bus conductor in a first time slot determined by the address information, said voltage responds linearly to the first potential on the information input IN1. If the information input IN2 is kept at a second potential within said limits, the transmission unit will try to achieve a voltage on the first bus conductor in a second time slot determined by the address information, said voltage depends linearly on the second potential on the information input IN2. If the information input IN3 is kept at a third potential within said limits, the transmission unit will try to achieve a voltage on the first bus conductor in a third time slot determined by the address information, said voltage responds linearly to the third potential on the information input IN3. The corresponding applies if the fourth information input IN4 is kept at a fourth potential. If an information input is kept at a potential above or below said limits, the transmission unit will try to achieve, in a time slot determined by the address information, a predetermined highest voltage or a predetermined lowest voltage on the bus conductor.

Figure 2:
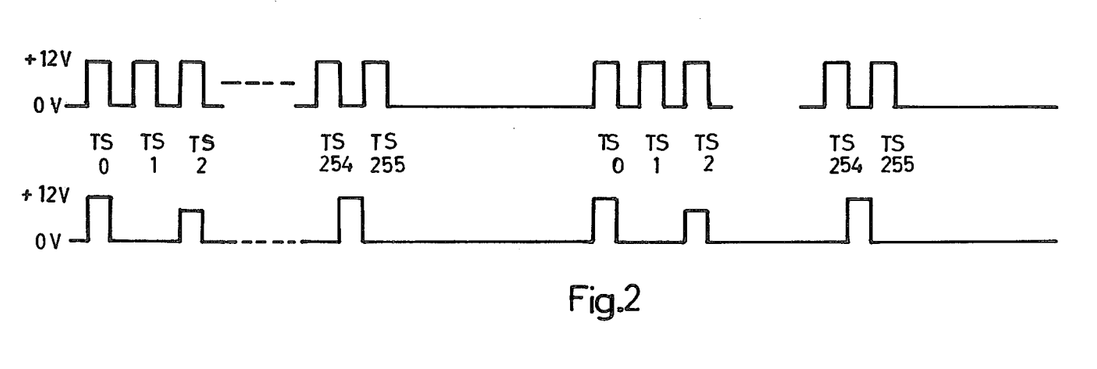
FIG. 2 illustrates an embodiment of the implementation of timing signals and examples of analogue and digital signals on a bus conductor in a system according to FIG. 1.

Transmission of information signals from a transmission unit can either take place during the first halves of the time slots, i.e. simultaneously with the pulses in the timing signals, or during the second halves of the time slots, i.e. in the time between the pulses in the timing signals. If the potential on an ordinal sequence input M on the transmission unit is low, the unit sends possible information from its information inputs only during the first halves of the four time slots. If the potential on the ordinal sequence input M of a transmission unit is high, the unit sends possible information from its information inputs only during the second halves of the four time slots. In FIG. 2, it has been illustrated how pulses with an amplitude of about 12 V are transmitted on the bus conductors BC1 during the first half of the time slot TS0 and the second half of the time slot TS254. During the first half of the time slot TS3 pulses are transmitted with an amplitude of about 8 V on the bus conductor BC1.

The activation input TS0IN is intended for binary activating signals. If the potential on the activation input TS0IN is high, a transmission unit tries, in its active mode, to achieve a high voltage on the first bus conductor in the time slot TS0, irrespective of the address information. If the potential on the activation input TS0IN is low, a transmission unit in its active mode does not try to achieve a high voltage on the first bus conductor in the time slot TS0.

In its active mode, a transmission unit can also transmit information to its analogue information outputs AU1-AU4 and its digital information outputs DU1-- DU4, in correspondence to information signals on the first bus conductor, in time slots determined by the address information. Information appearing in different time slots is transmitted to different information outputs. For example, a transmission unit tries in its active mode to generate on its analogue information output AU1 a potential, corresponding to the voltage on the first bus conductor, in the first time slot determined by the address information. Furthermore, the transmission unit in its active mode tries to generate on its analogue information output AU2 a potential, corresponding to the voltage on the first bus conductor, in the second time slot. The transmission unit also tries in its active mode to generate potentials on its analogue information outputs AU3 and AU4, corresponding to the voltage on the first bus conductor, in the third or the fourth time slot determined by the address information.

On each of its digital information outputs, a transmission unit tries to generate in its active mode either a predetermined high potential or a predetermined low potential. If the voltage on the first bus conductor, in the first time slot determined by the address information, exceeds a threshold value, the transmission unit tries to generate the high potential on the digital information output DU1. If instead, the voltage in the first time slot falls below the threshold value, the information unit tries to generate the low potential on the digital information output DU1. When the voltage, on the first bus conductor, in the second time slot determined by the address information exceeds the threshold value, the transmission unit tries to generate the high potential on the digital information output DU2. If instead, the voltage on the bus conductor BC1 in the second time slot falls below the threshold value, the transmissison unit tries instead to generate the low potential on the digital information output DU2. Depending on whether the voltage on the first bus conductor, in the third time slot determined by the address information, exceeds or falls below the threshold value, the transmission unit in its active mode tries to generate the high or the low potential, respectively on the digital information output DU3. When the voltage on the first bus conductor, in the fourth time slot determined by the address information, exceeds the threshold value, the transmission unit strives to generate the high potential on its digital information output DU4. If instead, the voltage on the first bus conductor in the fourth time slot falls below the threshold value, the transmission unit tries to generate the low potential on its digital information output DU4.

The threshold value is preferably the mean value of the predetermined highest voltage and the predetermined lowest voltage, or the mean value of the potentials on the bus conductors BC3 and BC4.

A transmission unit can transmit information to its information outputs, either in correspondence to the information signals on the bus conductor BC1 in the first halves of the four time slots, or in correspondence to the information signals on the bus conductor BC1 during the second halves of the four time slots. If the potential on an ordinal sequence input M on a transmission unit is low, the transmission unit transmits to its information outputs, during the second halves of the time slots, information corresponding to the information signals. If the potential on the ordinal sequence input of a transmission unit is high, the transmission unit transmits to its information outputs during the first halves of the time slots information corresponding to the informations signals.

From the above, it will be understood that each transmission unit in its active mode can transmit in time multiplex information in analogue or digital form from its information inputs to the bus B. Each transmission unit can also in its active mode transmit information in time multiplex in analogue or digital form from the bus B to its information outputs. Each transmission unit has in its active mode a total of four time slots for transmission of information to and from the bus. Each of these four times can, irrespective of the remaining ones, be used both for transmission of information to the bus and for receipt of information from the bus. For example, the first and the fourth time slot may by used for receiving analogue information from the information inputs IN1 and IN4, simultaneously as the second time slot is used for transmission of digital information to the information input DU2, and the third time slot is used for transmitting analogue information to the information output AU3.

By supplying the same address information to two or more transmission units, the time slots on the first bus conductor can be common for two or more transmission units. By applying two or more transmission units with similar but not identical address information, two or more transmission units can at least have one common time slot on the first bus conductor and each have at least one time slot which is not common. Information can be transmitted analogously or digitally between transmission units having at least one common time slot and different potentials on the ordinal sequence inputs. The information can be either solely in one optional direction, or in both directions between the transmission units. All available time slots naturally do not need to be utilized.

Transmission and reception of information solely in half time slots signifies that there is formed a pair of information transmission channels in each time slot. The number of information transmission channels is thus doubled without increasing the pulse frequency of the timing signals. The main object with this division of time slots or doubling the information transmission channels it to create channels for acknowledgement and signalling faults.

A transmission unit which is in its active mode goes to its standby mode when timing signals are not present on the second bus conductor during a given time.

In its standby mode, a transmission unit does not transmit any information from any of the information inputs IN1–IN4 to the bus B. Neither does the transmission unit transmit in its standby mode any information from the bus B or to any of its analogue information outputs AU1–AU4 or digital information outputs DU1–DU4. On the other hand, an information unit can transmit in its standby mode binary activating signals from its activation input TS0IN to the first bus conductor. For example, if the potential on the activation input TS0IN is high, when the transmission unit is in its standby mode, the unit tries to achieve a high voltage on the first bus conductor. If the potential on the activation input TS0IN is low, when the transmission unit is in its standby mode, the unit does not try to achieve a high voltage on the first bus conductor.

A transmission unit in its standby mode goes over to its active mode in response to its potential to the state input TS1E and also on the presence of timing signals on the second bus conductor. If the potential on the input TS1E is low, a transmission unit goes from a standby mode to its active mode as soon as the timing signals occur on the second bus conductor. If the potential on the state input TS1E is high, a unit first goes from its standby mode when the timing signals occur on the second bus conductor, and the voltage on the first conductor in the time slot TS1 is high. When timing signals are present on the second bus conductor, certain transmission units can therefore be in their standby modes while other units are in their active modes.

Figure 3:
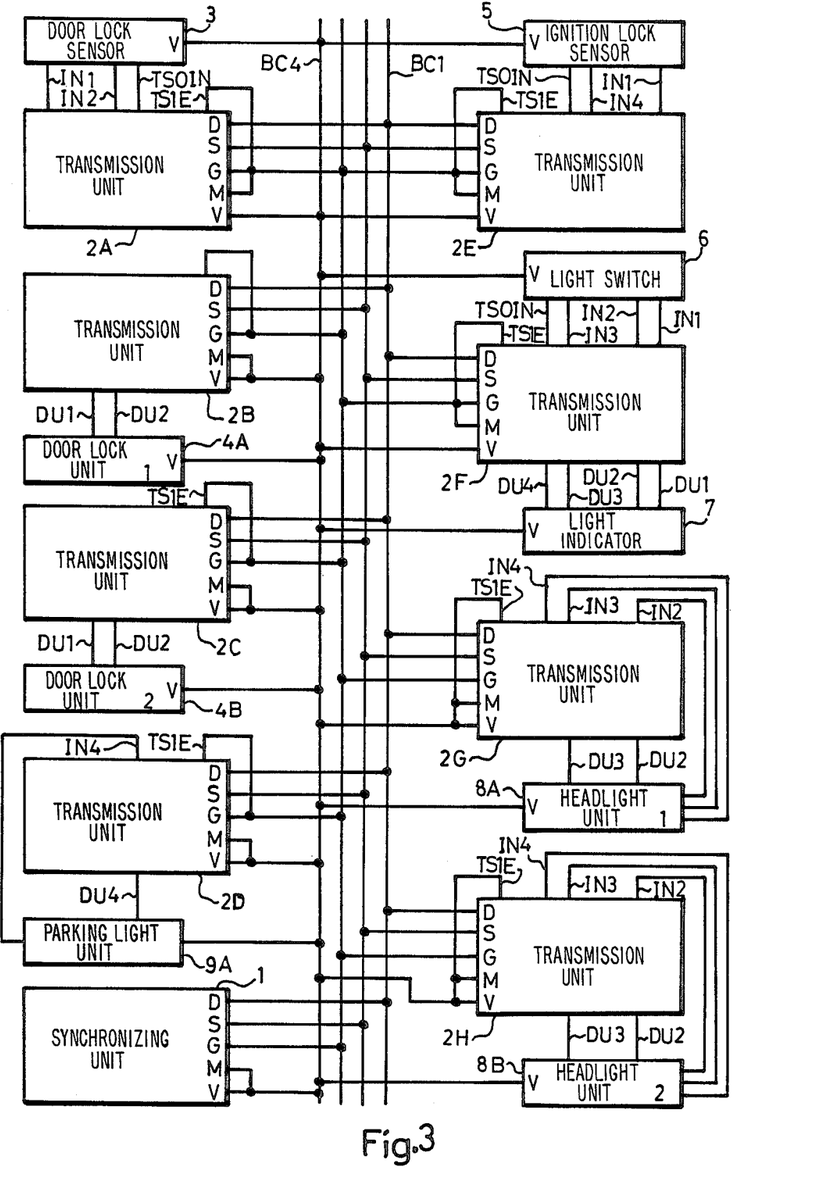
FIG. 3 illustrates, somewhat simplified, the connection of vehicle components to a system in accordance with the invention.

In FIG. 3 there is illustrated, somewhat simplified, in the form of a block diagram how a system in accordance with the invention can be used for transmitting information between vehicle components in an automobile. For the sake of space a complete system for all vehicle components is not illustrated in FIG. 3, but only a minor portion of a system in connection with a few vehicle components. Only one synchronizing unit is illustrated for reasons of saving space.

The bus B, synchronizing unit 1 and transmission units 2A–2H in FIG. 3 are of the type described in connection with FIG. 1. For reasons of space, not all the inputs and outputs of the transmission units are illustrated in FIG. 3.

A door lock sensor 3 has a feed voltage input V connected to the fourth bus line BC4. The door lock sensor has a first, a second and a third output respectively connected to the inputs IN1, IN2 and TS0IN of the transmission unit 2A. The sensor is adapted for generating a high potential on the output which is connected to the input TS0IN only when a door key is inserted in the automobile door lock. The sensor is further adapted to generate on its first output connected to the input IN1 a high potential only when a door key is inserted in the lock and turned to an unlocking position. Finally, the sensor is adapted to generate a high potential on its second output connected to the input IN2, only if a door key is inserted in the lock and turned to a locking position.

Two door lock units 4A and 4B with electric control each have their feed voltage input V connected to the bus line BC4. Each of the locks has a first control input and a second control input coupled respectively to outputs DU1 and DU2 on their respective associated transmission unit 2B and 2C. Each of the door lock units is adapted to unlock a door lock when the potential is high on its first control input connected to the output DU1 on its transmission unit simultaneously as the potential is low on its other control input connected to the output DU2 on its transmission unit. In addition, each of the door lock units is adapted to lock a door lock when the potential is low on its first control input connected to the output DU1 simultaneously as the potential is high on this second control input connected to the output DU2.

An ignition lock sensor 5 has a feed voltage input V connected to the bus line BC4 and three outputs respectively coupled to the inputs TS0IN, IN1 and IN4 of a transmission unit 2E. The sensor is adapted to generate on a first ouptut connected to the input TS0IN a high potential only when a ignition lock key is inserted in the ignition lock on the automobile. The sensor i further adapted to generate a high potential on the second output connected to the input IN1 only when the key in the ignition lock has been turned to a position where the engine ignition is connected. Finally, the sensor is adapted to generate on a third output connected to the input IN4 a high potential only when the ignition key in the ignition lock has been turned to a "garage" position where the engine ignition is disconnected or to a position where the engine is connected.

A manually adjustable light switch 6 has a feed voltage input V connected to the bus line BC4 and four outputs coupled respectively to the inputs TS0IN, IN1, IN2 and IN3 of a transmission unit 2F. The switch is adapted to generate a low potential on the outputs connected to the inputs TS0IN and IN1 when it is OFF but to generate a high potential on these outputs when it is set to a parking light position, a low beam position or a high beam position. The switch is further adapted to generate a high potential on its third output connected to the input IN2 only when it is set to a low beam position. Finally, the switch is adapted to generate a high potential on its fourth output connected to the input IN3 only when it is set for high beam.

Two headlight units 8A and 8B with respective associated left and right headlight have their feed voltage input V connected to the bus line BC4. Each of the units 8A and 8B has a first control input and a second control input connected respectively to the outputs DU2 and DU3 of the transmission units 2G and 2H. Each headlight unit is adapted to switch on its low beam only when the potential on its first control input connected to the output DU2 is high, simultaneously as the potential on its second input connected to the output DU3 is low. Each headlight unit is also adapted to switch on its high beam only when the potential on its first input is low, simultaneously as the potential on its second input is high. Finally, each head light unit is adapted to switch off both its high beam and its low beam if the potentials on both of these control inputs become high simultaneously or low simultaneously.

For monitoring the vehicle exterior illumination there is, inter alia, a light indicator 7 and monitoring means in the head light units. The light indicator has a feed voltage input V connected to the bus line BC4 and four inputs respectively connected to the outputs DU1, DU2, DU3 and DU4 of the transmission unit 2F. Each headlight unit has three outputs from its monitoring means respectively connected to the inputs IN2, IN3 and IN4 of the transmission units 2G and 2H respectively. The monitoring means of the unit are adapted to generate a high potential on a first output connected to the input IN2 of the transmission unit only for a fault in the low beam and on a second output connected to the input IN3 to generate a high potential only for fault in the high beam. In addition, each unit is adapted for generating a high potential on a third output connected to the input IN4 of the transmission units only when the high beam is switched on.

A parking light unit 9A has a feed voltage input V connected to the bus line BC4 and a control input connected to the output DU4 of the transmission unit 2D. The unit has an output connected to the input IN4 of the transmission unit 2D. The parking light is adapted to switch on a parking light only when the potential of its control input is high. It has a monitoring means and is adapted to generate on its output a high potential for a fault in the parking light.

The light indicator is adapted to generate, only for a high potential on its input connected to the output DU1 of the transmission means 2F, an indication of fault in the parking light. The indicator is also adapted to generate only for high potential on its input connected to the output DU2 of the transmission means 2F an indication of fault in the low beam. When the potential on the light indicator input connected to the output DU3 of the transmission means 2F is high, the indicator is adapted to indicate a fault in the high beam. For a high potential on the input connected to the output DU4 the indicator is adapted to indicate that the high beam is switched on.

The transmission units 2A, 2E and 2F have their inputs TS1E and M connected to their connections G. The transmission units 2G and 2H have their inputs TS1E and M connected to their inputs V. The transmission units 2B, 2C and 2D have their inputs TS1E connected to their connections G, but their inputs M connected to their inputs V.

Power supply to all vehicle components and units takes place via the fourth bus line BC4 and respective input V, the automobile chassis being utilized as return conductor. The components and the units are thus each electrically connected to the automobile chassis. It is usual in electrical wiring diagram of mobile equipment to denote the chassis as ground and in describing the equipment to assume that the chassis has the potential 0 volts. For the function of a system in accordance with the present invention in an automobile it is of minor importance what potential the automobile chassis has. On the other hand, the potential on the inputs and outputs of components and units, as well as bus lines in relation to the chassis potential is of importance. For the sake of simplicity, it is therefore assumed in the continued description that the chassis functions as ground and has the potential 0 volts. It is further assumed, for the sake of simplicity, that the negative terminal of the automobile battery is grounded, which is usual, the potential of fourth bus line thus nominally exceeding the chassis potential by the battery voltage, which is assumed to be 12 volts. The third bus line BC3 is assumed, for the sake of simplicity, to be connected to the negative terminal of the battery or to a suitable part of the chassis, whereby this bus line nominally has the potential 0 volts.

The function of the system in FIG. 3 is best understood by a decription of the state of the system and its parts as well as the vehicle components and the signals present in different situations.

When the ignition key is removed from the ignition lock, and the door key is removed from the door lock and the light switch is turned to OFF the potential is low on all the inputs TS0IN and IN1–IN4 of all the transmission units. Accordingly, no transmission unit tries to achieve a high potential on the bus line BC1 in any time slot. The constant low potential on the bus line BC1 causes the synchronizing unit to go to its standby state after a given time, if it is not already in this state, whereby no timing signals are sent on the bus line BC2. The absence of timing signals on the bus BC2 causes each transmission unit to go its standby state, if it is not already in this state. With the synchronizing unit and all transmission units in their standby states, the entire system is also in a standby state, which exists until the potential on some transmission unit input TC0IN becomes high.

Figure 4:
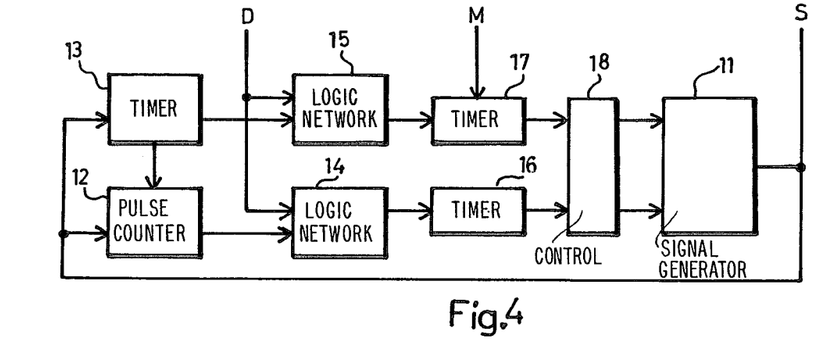
FIG. 4 is a somewhat simplified block diagram of a synchronizing unit in accordance with the invention.

The potential on the input TS0IN of the transmission unit 2A becomes high if the door key is inserted in the door lock. The potential on the input TS0IN of the transmission unit 2E will be high if the ignition key is inserted in the ignition lock. If the light switch is set to parking light position, low beam position or high beam position the potential will be high on the input TS0IN of the transmission unit 2F. Irrespective of which transmission unit input TS0IN is given a high potential, the unit concerned causes the potential on the bus line BC1 to be high. The synchronizing unit is sensitive to the potential on the bus line BC1, and changes to its active state when the potential on the bus line BC1 becomes high. In its active state the synchronizing unit sends timing signals on the bus line BC2. The transmission units are sensitive to the timing signals on the bus line BC2. The transmission units which have low potential on their input TS1E, i.e. the transmission units 2A–2F, change to their active state when the timing signals are present on the bus line BC2. On the other hand, the transmission units which have high potential on their input TS1E, i.e. the transmission units 2G and 2H do not change to their active state before the potential on the bus line BC1 in the time slot TS1 becomes high. The high potential on one of the inputs TS0IN thus leads to the synchronizing unit and certain transmission units in the system changing to their active states while other transmission units can remain in their passive states. As long as the potential on at least one transmission unit input TS0IN continues to be high, the synchronizing unit and at least certain of the transmission units will remain in their active state. The transmission units 2A, 2B and 2C have been supplied with the same address information on their address inputs, which are not illustrated in FIG. 3. Futhermore, the potential is low on the input M of the transmission unit 2A, but high on the input M of the transmission units 2B and 2C. The transmission unit 2A can thus send, and the transmission units 2B and 2C receive information on the bus line in the first half of each of the four successive time slots. The potentials on the outputs DU1 of each of the transmission units 2B and 2C therefore respond in the same way to the potential on the input IN1 of the transmission unit 2A. In addition, the potentials on the outputs DU2 of each of the transmission units 2B and 2C respond in the same way to the potential on the input IN2 of the transmission unit 2A. With the synchronizing unit and the transmission units 2A–2C in their active states, the locks of the automobile doors can thus be synchronously locked and unlocked by turning the door lock key. The transmission units 2F, 2G and 2H have been given the same address information on their address inputs, which are not illustrated in FIG. 3. This address information differs from the address information given to the transmission units 2A–2C. Furthermore, the potential is low on the input M of the transmission unit 2F, but high for the transmission units 2G and 2H. Accordingly, the transmission unit 2F can send, and the transmission units 2G and 2H receive information on the bus line in the first half of each of four successive time slots. In addition, each of the transmission units 2G and 2H can send, and the transmission unit 2F receive information on the bus line in the second half of each of the four successive time slots. The potential of the outputs DU1 of the transmission units 2G and 2H therefore respond in the same way to the potential on the input IN1 of the transmission unit 2F. The potentials on the outputs DU2 and DU3 of the transmission units 2G and 2H respond in a corresponding way to the potentials on the inputs IN2 and IN3 of the transmission unit 2F. With the synchronizing unit and the transmission units 2F–2H in their active states, the automobile high and low beams on the left and right sides can thus be switched on and off synchronously. If the potential becomes high on the input IN2 of the transmission unit 2G or 2H, the potential will be high on the output DU2 of the transmission unit 2F. In a corresponding way the potential will be high on the output DU3 or DU4 of the transmission unit 2F if the potential becomes high on the respective input IN3 asnd IN4 of one or both of the transmission units 2G and 2H. With the synchronizing unit and transmission units 2F–2H in their active state, faults in the low beam or high beam and turned-on high beam can be indicated. The transmission unit 2D has been given address information differing somewhat from that supplied to the transmission units 2F–2H, so that the last of the four time slots of the transmission unit 2D agrees with the first of the four time slots of the transmission units 2F–2H. Furthermore, the potential is high on the input M of the transmission unit 2D. With the synchronizing unit and the transmission units 2D and 2F in their active state, a parking light can be switched on and off and a fault in it be detected. With further parking light units and transmission units not illustrated in FIG. 3 but connected in the same way as the transmission unit 2D and the parking light unit 9A, further parking lights can be turned on and off synchronously with the parking light associated with the unit 9A. A simplified block diagram of a synchronizing unit for a system in accordance with the invention is illustrated in FIG. 4. The synchronizing unit includes a signal generator 11 for generating timing signals when the synchronizing unit is in its active state, a pulse counter 12 for counting pulses in the timing signals, a first time interval device 13 for detecting the absence of pulses, a first logic network 14 for generating an output signal at the absence of information signals in both time slots TS0 and TS1, a second logical network 15 for generating an output signal on the absence of pulses when the potential on the first bus line is high, a second time interval device 16 for generating an output signal when the synchronizing unit is to transfer from active state to its standby state, a third time interval device 17 for generating an output signal when the synchronizing unit is to transfer from its standby state to its active state, and finally a control means 18.

The pulse counter counts possible pulses on its counter input and is set to zero by zero-setting signals on its zero-setting input. The pulse counter generates an output signal to the first logical network 14 when its count is zero or one, i.e. during the time slot TS0 and TS1 when the synchronizing unit is in an active state. The first time interval device 13 measures the spacing between successive pulses and generates a zero-setting signal to the counter when the spacing is considerably greater than normal, i.e. at least as great as two complete time slots. When the counter is set to zero, it generates a signal to the first logical network up until it has counted to two. The counter generates this outputs signal even when the synchronizing unit is in its standby state.

The first time interval device 13 further generates an output signal to the second logical network 15 when the pulse spacing is substantially greater than normal. Both logical networks are connected to the input D of the synchronizing unit for receiving possible information signals on the bus line BC1. The first logical network 14 generates an output signal to the second time interval device 16 when the potential on the input D is high simultaneously as the signal from the counter denotes that its content is zero or one. The second time interval device 16 generates an output signal to the control means 18 when no signal is received from the second time interval device during a given time longer in duration than a complete timing signal, preferably the duration of two or more timing signals.

The second logical network generates an output signal to the third time interval device when the potential on the input D is high simultaneously as the signal from the first time interval device denotes that the pulse spacing is substantially greater than normal.

The third time inteval device is adapted to generate an output signal to the control means when a signal has not been received from the second logical network continuously during a selectable time. For a high potential on the input M the selectable time is shorter and for a low potential it is longer. Irrespective of the potential on the input M, the shorter time is however at least as long as the spacing between the last pulse in a timing signal and the first pulse of the next successive timing signal from an active synchronizing unit. The longer time is preferably at least equally as long as a whole timing signal.

The control means is adapted to have two states, and retains its present state in the absence of signals on its inputs. It is also adapted to assume a first state on receiving a signal from the second time interval device 16, and to assume a second state on receiving a signal from the third device 17. The control means has outputs connected to the control inputs of the signal generator, and controls the signal generator to generate timing signals when the cotrol means is in its second state but not when it is in its first state.

Figure 5:
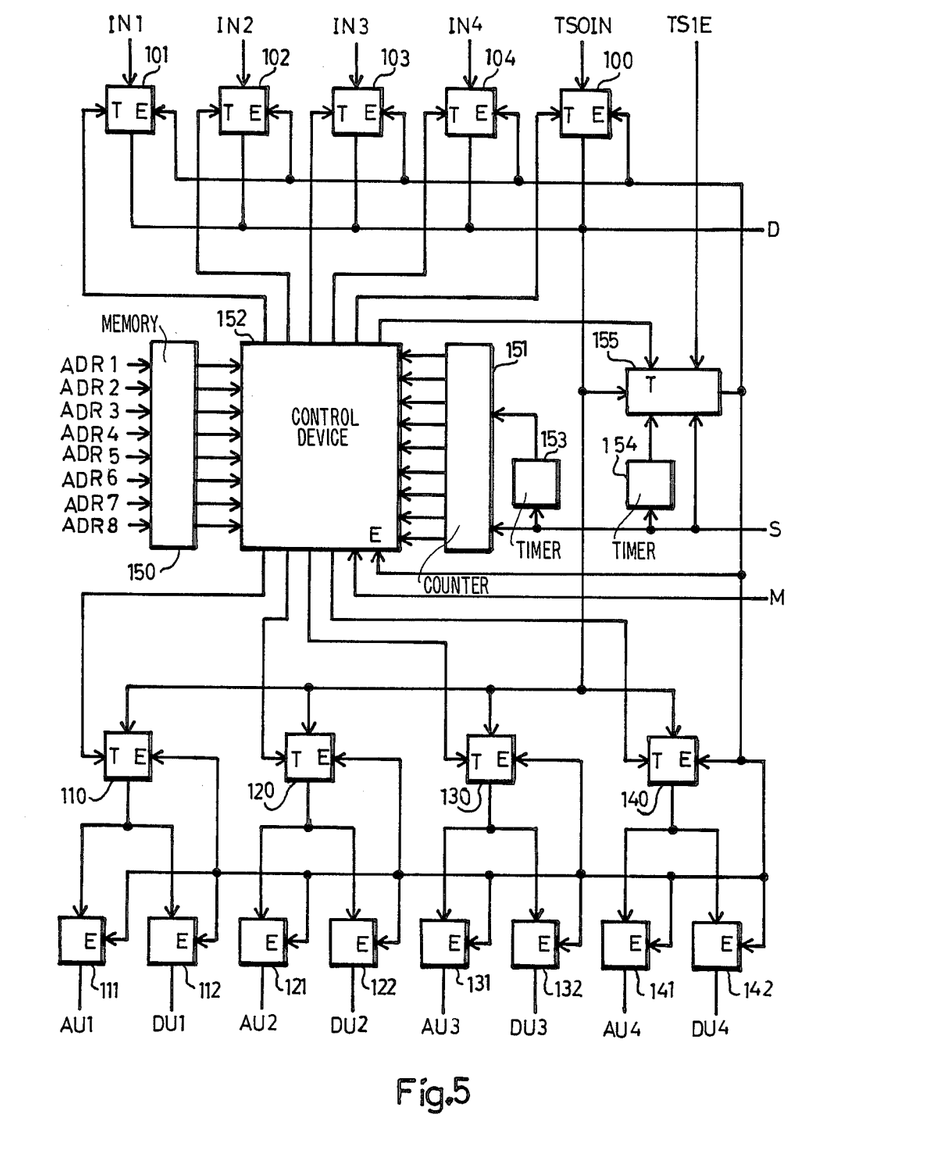
FIG. 5 is a somewhat simplified block diagram of a transmission unit in a system in accordance with the invention.

A simplified block diagram of a transmission unit for a system in accordance with the invention is illustrated in FIG. 5. The transmission unit includes five input device 100-104, each with its respective input TS0IN and IN1-IN4, eight output devices 111, 112, 121, 122, 131, 132, 141 and 142 for each of the analogue information outputs AU1-AU4 or digital information outputs DU1-DU4, four sampling devices 110, 120, 130 and 140 for each of the respective analogue and digital information output, an address memory 150 for address information, a time slot counter 151 for counting pulses in the timing signal, a comparison and control device 152 for comparing address information and counter content as well as controlling input and output devices, two time interval devices 153 and 154 for sensing the spacing between pulses in the timing signals, and finally a state change device 155 for determining the active state or the standby state of the transmission unit.

The time slot counter 151 has a counter input connected to the transmission unit input S and a zero-setting input connected to the time interval device 153. The time slot counter is adapted to count pulses on its counter input, to be set zero by zero-setting signals from the time interval device 153, and to send its counter content on its outputs to the comparison and control device 152.

The comparison and control device has inputs connected to the outputs of the address memory and time slot counter. Furthermore, this device has an ordinal sequence input connected to the input M and a state input E connected to a state output of the state change device. The comparison and control device has further five outputs each connected to a time slot input T of an input device and four other outputs each connected to a time slot input T on the sampling devices and a further output connected to a time slot input T on the state change means. The comparison and control device is adapted to compare the counter content, with fixed information and address information, and in response to the comparison and the potential on the ordinal sequence input generate a time slot signal on one of its ten outputs. When the counter content of the counter corresponds to the time slot TS0, the comparison and control device 152 generates a time slot signal to the input device 100. When the content corresponds either to the time slot TS0 or the time slot TS1, the comparison and control device generates a time slot signal to the state change device 155. When the content corresponds to the first of the four time slots given by the address information, the comparison and control device generates time slots signals to the input device 101 in a half of the time slot and to the sampling device 110 in the outer half of the time slot. When the content corresponds to the second of the four time slots given by address information, the comparison control device generates time slot signals to the input device 102 in one half of the time slot, and time slot signals to the sampling device 120 in the other half of the time slot. In a corresponding way, the comparison and control device generates time slot signals to the input device 103 and the sampling device 130, the third time slot and to the input device 104 and sampling device 140 in the fourth time slot.

The potential on the ordinal sequence input decides in what half of the respective time slot of the input devices and sampling devices are supplied with time slot signals. For a low potential on the ordinal sequence input the input devices are supplied with time slot signals in the first half of the respective time slot, while the sampling devices are supplied time slot signals in the second half of the respective time slot. For a high potential on the ordinal sequence input the input devices are supplied with time slot signals in the second half of the respective time slot, while the sampling devices are supplied with time slot signals in the first half of the respective time slot.

The state change device 155 has an input for signals from the state input TS1E, an input connected to the combined input and output D of the transmission unit, an input T for time slot signals from the comparison and control device, an input for timing signals connected to the trasmission unit input S, and a further input connected to the time interval device 154. The time interval device 154 is sensitive to the time spacing between successive pulses in the timing signals. The time interval device is adapted to generate an output signal when the time spacing between two successive pulses on the input S does not substantially exceed the normal spacing between the last pulse in a timing signal and the first pulse in the nearest successive timing signal from a synchronizing unit in its active state.

The state change device is adapted for beginning to generate an activation signal on its state output either if the potential on the input TS1E is low, simultaneously as the time interval device 154 generates an outputs signal, or if the potential on the input TS1E is high, simultaneously as the potential on the input D is high, and thus causing the state change device to receive a time slot signal. If the state change device has begun to generate an activating signal, it does not cease automatically to generate activating signals when the condition for starting to generate the activating signal ceases, e.g. due to no time slot signal being received. The state change device is adapted to cease generating an activating signal either if the timing device ceases to generate an output signal, or if the potential on the input TS1E is high, simultaneously as the potential is low on the input D, and thus causing the state change device to receive a time slot signal 1.

The input devices 101–104 each have their state input E connected to the output of the state change device, and each of their outputs connected to the combined input and output D of the transmission device. Each input device is adapted such that, on simultaneous reception of an activating signal on its state input and a time slot signal on its time slot input, it generates a potential on its output connected to D, this potential corresponding within certain predetermined limits to the potential on that of the inputs IN1–IN4 which is connected to the input device. The input device 100 is adapted to generate in a corresponding way a potential corresponding to the potential on the input TS0IN. Furthermore, the input device 100 is adapted such that, in the absence of an activating signal on its state input E, it generates the corresponding potential irrespective of a possible time slot signal on the slot input T. On the other hand, the input devices 100–104 are adapted such that, in the absence of an activating signal on their state inputs, they do not maintain any given potential on their outputs but let this potential float freely in the same way as when they do not receive any time slot signal.

The sampling devices 110, 120, 130 and 140 also each have a state output E connected to the output of the state change device, and each have an input connected to the combined input and output D of the transmission unit.

Furthermore, they have outputs each connected to one of the output devices for the analogue information outputs (AU1–AU4) and to one of the outputs for the digital information outputs DU1–DU4. Each sampling device is adapted such that on simultaneous reception of an activating signal on its state input and a time slot signal on its time slot input it samples the potential on its input, and thereafter generates on its output a potential corresponding to the latest sampled potential on the input.

The output devices for the analogue information outputs each have a state input E and are adapted such that, on reception of an activating signal on their state input, they generate an output signal corresponding to the potential of the output of the respective sampling device.

The output devices for the digital information outputs each have a state input E for activating signals from the state change device. These output devices differ from the output devices for the analogue information outputs primarily in that they are adapted to compare the potential from the respective sampling device with a predetermined threshold value. On reception of an activating signal, the output device for the digital information outputs are adapted to generate a predetermined high potential on their output if the output potential on the sampling device exceeds the threshold value, but generate a predetermined low potential on their output if the output potential on the sampling device falls below the threshold value.

The output device for the analogue information outputs and the digital information outputs are further adapted such that, in the absence of activation signals on their state inputs, they do not maintain any given potential on their outputs, but let this potential float freely.

The invention is of course not restricted to the embodiment described above, and a system in accordance with the invention can deviate in several aspects from this embodiment. For example, a synchronizing unit in the system does not need to be implemented according to FIG. 4, and a transmission unit does not need to be implemented according to FIG. 5. The number of time slots does not need to be just 256, and each transmission unit does not necessarily need to have four time slots for transmitting and receiving information. Although four time slots are to be performed, it is conceivable that a transmission unit has three or five time slots.

All transmission units do not need to be identical, even if this is to be preferred from the point of view of flexibility and maintenance. All transmission units do not need to send and receive information solely during half time slots even if this is to be preferred. It is conceivable that only one or more than two synchronizing units are used. If there are more than one synchronizing unit, they must be implemented so that they do not simultaneously change from a standby state to an active state, and so that only one synchronizing unit at a time sends timing signals. If there is only one synchronizing unit, it may possibly be arranged such that in its standby state it sends intermittently only a part of a timing signal, this part comprising the time slots TS0 and TS1.

The transmission units and the synchronizing units are preferrably manufactured as integrated circuits, possiby with exception for some frequency or time determining resistor or capacitor.

Further modifications are conceivable within the scope of the claims.

We claim:

1. A system for time multiplex transmission of information between a plurality of vehicle components, comprising:
   a bus having a first bus line and a second bus line;
   a synchronizing unit, coupled to said bus, including means for generating a plurality of control signals on said second bus line, for defining a plurality of time slots on the bus, when said synchronizing unit is in a synchronizing unit active state, means for disabling said generating means from generating at least some of said plurality of control signals when said synchronizing unit is in a synchronizing unit standby state, and means for placing said synchronizing unit in said synchronizing unit active state in response to a signal on said first bus line;

a first transmission unit, coupled to said bus, including means for transferring information in at least one direction between the first bus line and a vehicle component in a first active state assumed in response to receipt of predetermined control signals from said synchronizing unit; and a second transmission unit, coupled to said bus, including means for transferring information in at least one direction between the first bus line and a vehicle equipment in a second active state assumed in response to receipt of information signals in at least one predetermined time slot on the first bus line, and means for causing said second transmission unit to assume a standby state in response to an absence of information signals in at least one predetermined time slot on the first bus line.

2. A system in claimed in claim 1, in which the synchronizing unit further includes means for causing said synchronizing unit to go from said synchronizing unit active state to said synchronizing unit standby state in response to an absence of information signals in one or a plurality of predetermined time slots on the first bus line, irrespective of the presence of information signals in one or more of the other time slots on the first bus line.

3. A system as claimed in claim 1, in which the synchronizing unit includes means for causing said synchronizing unit to send intermittently on the second bus line only a limited control signal, which defines only a small number of time slots on the bus.

4. A system as claimed in claim 1, in which one of said first transmission unit and second transmission unit includes means for sending analogue information to another transmission unit when said one of said first and second transmission units is in its active state.

5. A system as claimed in claim 1, in which each transmission unit includes means for sending one of a single analogue sampled potential and a single binary signal per time slot on the first bus line, and in which each transmission unit further includes means for receiving one of a single analogous sampled potential and a single binary signal per time slot on the first bus line.

6. A system as claimed in claim 1, in which each transmission unit includes means for transferring information in at least three and at most five time slots on the first bus line, and in that each transmission unit includes means for individual determination of the at least three and at most five time slots.

7. A system as claimed in claim 1, in which each transmission unit includes means for sending information on the first bus line solely during one of the first and second half of at least one time slot and for receiving information from the first bus line solely during the other of the first and second half of said at least one time slot.

8. A system for time multiplex transmission of information between vehicle components, said system including a first and a second synchronizing units and a plurality of similar transmission units connected to a bus having at least three bus conductors for power supply and transmission of signals between the units;

said first synchronizing unit including means for enabling it to assume an active state in which it sends timing signals on the bus for synchronizing the transmission units, and for defining a plurality of time slots on the bus, said first synchronizing unit including means for enabling it to assume a standby state in which it does not send timing signals, said first synchronizing unit further including means for transfer from its standby state to its active state when signals from a transmission unit have been present on the first bus conductor for a comparatively short time, simultaneously as timing signals have not been present on the second bus conductor during that short time;

said second synchronizing unit including means for enabling it to assume an active state in which it sends timing signals on the bus, said second synchronizing unit further including means for enabling it to assume a standby state in which it does not send timing signals on the bus, said second synchronizing unit further including means for transfer from its standby state to its active state not until signals from a transmission unit have been present on the first bus conductor for a comparatively long time, simultaneously as timing signals have not been present on the second bus conductor during that long time; said transmission units each having at least one of an input and an output for tranferring information in at least one direction between a vehicle component and the first bus conductor, said transmission units each comprising means for enabling them to assume an active state in which a given transmission unit receives timing signals from either one of said synchronizing units and selectively transfers in a predetermined time slot on the first bus conductor information signals in correspondence to information on and said one of an input and output information in correspondence to information signals appearing in a predetermined time slot (TSN) on the first bus conductor, said transmission units each including means for enabling them to assume a standby state in which a given transmission unit does not selectively transfer information in correspondence to any information signals in any given time slot on the first bus conductor;

a first group of said transmission units being controlled to transfer from their standby state to their active state on the presence of the timing signals on the bus; each synchronizing unit including means for sending its time controlling signals defining the time slots on a second bus conductor separated from the the first bus conductor and a second group of transmission units being controlled to transfer from their standby state to their active state on the presence of information signals in at least one predetermined time slot on the first bus conductor, said second group being controlled to transfer from their active state to their standby state in response to an absence of information signals in at least one predetermined time slot on the first bus conductor.

9. A system as claimed in claim 8, in which each of the first and the second synchronizing units includes means for changing its active state to its standby state in response to the absence of information signals in one or a plurality of predetermined time slots on the first bus conductor, irrespective of the presence of information signals in at least one of the other time slots on the first bus conductor.

10. A system as claimed in claim 8, in which at least one transmission unit in its active state is adapted for transmission of analogue information from an input to another transmission unit via the first bus conductor.

11. A system as claimed in claim 8, in which each transmission unit includes means for sending at least one of a single analogue sampled potential and a single binary signal per time slot on the first bus conductor, and in that each transmission unit includes means for receiving at least one of a single analogue sampled potential and a single binary signal per time slot on the first bus conductor.

12. A system as claimed in claim 8, in which each transmission unit includes means for enabling it to transfer information in at least three and at most five time slots in succession on the first bus conductor, and in which each transmission unit includes means for selecting its time slots independent of the time slots selected by the remaining transmission units.

13. A system as claimed in claim 8, in which each transmission unit is controllable to transfer information between a vehicle component and the first bus conductor in a first direction solely during the first half of at least one time slot and to transfer information between a vehicle component and the first bus conductor in a second direction solely during the second half of this at least one time slot.

14. A system for time multiplex transmission of information between vehicle components, said system including a synchronizing unit and a plurality of substantially similar transmission units connected to a bus having at least three bus conductors for power supply and transmission of signals between the units;
said synchronizing unit including means for detecting signals from a transmission unit on a first of the bus conductors and means for generating timing signals on a second of the bus conductors;
said synchronizing unit including means for enabling it to assume an active mode of operation in which it regularly sends timing signals on the second bus conductor in the bus for synchronizing the transmission units, and for defining a plurality of time slots on the bus, said synchronizing unit including means for enabling it to assume a standby mode of operation in which it sends timing signals on the bus at most intermittently, the synchronizing unit including means for going from its standby mode of operation to its active mode when signals from a transmission unit have been present on the first bus conductor at least for a comparatively short time, simultaneously as timing signals have not been present on the second bus conductor at least for the same comparatively short time;
said transmission units each having at least one of an input for transferring information between a vehicle component and the first bus conductor, said transmission units each including means for detecting said timing signals on the second bus conductor, said transmission units each including means for enabling them to assume an active mode of operation in which a given transmission unit receives timing signals from said synchronizing unit and selectively transfers in a predetermined time slot on the first bus conductor information signals in correspondence to information on said one of an input and output information in correspondence to information signals appearing in a predetermined time slot on the first bus conductor, said transmission units each including means for enabling them to assume a standby mode of operation in which a given transmission unit does not selectively transfer information in correspondence to any information signals in any given time slot on the first bus conductor, said transmission units each having an activating input for individual control of the conditions under which the transmission unit shall go from its standby mode of operation to said active mode;
a first group of said transmission units being controlled to go from their standby mode of operation to their active mode on the presence of the timing signals on the bus; and
a second group of said transmission units being controlled to go from their standby mode of operation to their active mode on the presence of information signals in at least one predetermined time slot on the first bus conductor, said second group being controlled to go from their active mode to their standby mode of operation in response to an absence of information signals in at least one predetermined time slot on the first bus conductor.

15. A system for time multiplex transmission of information between vehicle components, said system including a first and a second synchronizing units and a plurality of substantially similar transmission units connected to a bus having at least three bus conductors for power supply and transmission of signals between the units;
said synchronizing units each including means for detecting signals from a transmission unit on a first of the bus conductors, means for generating timing signals and means for detecting timing signals on a second of the bus conductors;
said first synchronizing unit including means for enabling it to assume an active mode of operation in which it regularly sends timing signals on the second bus conductor in the bus for synchronizing the transmission units, and for defining a plurality of time slots on the bus, said first synchronizing unit including means for enabling it to assume a standby mode of operation in which it does not send timing signals on the bus, the first synchronizing unit further including means for changing from its standby mode of operation to its active mode when signals from a transmission unit have been present on the first bus conductor for a comparatively short time, simultaneously as timing signals have not been present on the second bus conductor;
said second synchronizing unit including means for enabling it to assume an active mode of operation in which it regularly sends timing signals on the second bus conductor, the second synchronizing unit further including means for enabling it to assume a standby mode of operation in which it does not send timing signals on the bus, the second synchronizing unit further including means for changing from its standby mode of operation to its active mode not until signals from a transmission unit have been present on the first bus conductor a comparatively long time, simultaneously as timing signals have not been present on the second bus conductor;

said transmission units each having at least one of an input for receiving from a vehicle component information which shall be transmitted on the first bus conductor and an output for information transmitted on the first bus conductor, said transmission units each including means for detecting said timing signals on the second bus conductor, said transmission units each comprising means for enabling them to assume an active mode of operation in which a given transmission unit receives timing signals from one of said synchronizing units and selectively transfers in a predetermined time slot between a vehicle component and the first bus conductor information signals in correspondence to information on said one of an input and output, said transmission units each including means for enabling them to assume a standby mode of operation in which a given transmission unit does not selectively transfer information in correspondence to any information signals in any given time slot on the first bus conductor, to any said transmission units each having a mode change input for individual control of the conditions under which the transmission unit shall change from its standby mode of operation to its active mode;

a first group of said transmission units being controlled via their mode change inputs to go from their standby mode of operation to their active mode on the presence of the timing signals on the bus; and a second group of said transmission units being controlled via their mode change inputs to change from their standby mode of operation to their active mode on the presence of information signals in at least one predetermined time slot on the first bus conductor, said second group being controlled via their mode change inputs to change from their active mode to their standby mode of operation in the absence of information signals in at least one predetermined time slot on the first bus conductor (BC1).

16. A system as claimed in claim 15, wherein each transmission unit includes means for sending one of a group consisting of a single analogue sampled potential and a single binary signal per time slot on the first bus conductor, and in that each transmission unit includes means for receiving one of a group consisting of a single analogue sampled potential and a single binary signal per time slot on the first bus conductor.

17. A system as claimed in claim 15, wherein each transmission unit includes means for enabling it to transfer information in at least three and at most five time slots in succession on the first bus conductor, and in that each transmission unit includes means for selecting its time slots independent of the time slots selected by the remaining transmission units.

18. A system as claimed in claim 15, wherein each transmission unit includes means controllable to transfer information in a first direction between a vehicle component and the first bus conductor solely during the first half of at least one time slot and to transfer information in a second direction between said vehicle component and the first bus conductor solely during the second half of said at least one time slot.

* * * * *